US 6,654,882 B1

(12) United States Patent
Froutan et al.

(10) Patent No.: US 6,654,882 B1
(45) Date of Patent: Nov. 25, 2003

(54) NETWORK SECURITY SYSTEM PROTECTING AGAINST DISCLOSURE OF INFORMATION TO UNAUTHORIZED AGENTS

(75) Inventors: Paul Froutan, San Antonio, TX (US); Eric Evans, San Antonio, TX (US)

(73) Assignee: Rackspace, LTD, San Antonio, TX (US)

( * ) Notice: Subject to any disclaimer, the term of this patent is extended or adjusted under 35 U.S.C. 154(b) by 11 days.

(21) Appl. No.: 10/153,645

(22) Filed: May 24, 2002

(51) Int. Cl.[7] .................................................. G06F 1/24

(52) U.S. Cl. ........................ 713/153; 713/189; 713/194; 713/200; 713/201

(58) Field of Search ................................. 713/153, 189, 713/194, 200, 201

(56) References Cited

U.S. PATENT DOCUMENTS

| 5,414,833 A | 5/1995 | Hershey et al. |
| 5,557,742 A | 9/1996 | Smaha et al. |
| 5,720,033 A | 2/1998 | Deo |
| 5,892,903 A | 4/1999 | Klaus |
| 5,991,881 A | 11/1999 | Conklin et al. |
| 6,279,113 B1 | 8/2001 | Vaidya |

*Primary Examiner*—Thomas R. Peeso
(74) *Attorney, Agent, or Firm*—Fulbright & Jaworski L.L.P.

(57) ABSTRACT

A network security system provides a complete, reactive, Network Intrusion Detection System (NIDS) designed to stop a would-be hacker from gaining unauthorized access by blocking their connectivity to a protected network at the first sign of malicious activity. The network security system utilizes a commercially available or open source NIDS that can detect patterns in TCP/IP activity as well as examining packet headers to detect probes and attempts to compromise systems. The network security system then modifies the return route from the "victim" protected network so that outbound packets are never returned to the attacker.

26 Claims, 2 Drawing Sheets

NETWORK SECURITY SYSTEM PROTECTING AGAINST DISCLOSURE OF INFORMATION TO UNAUTHORIZED AGENTS

FIELD OF THE INVENTION

The present invention is directed to intrusion detection for a computer-based system and, more particularly, to a network security system protecting a network from disclosure of information in response to maleficent message.

BACKGROUND OF THE INVENTION

Computer networks provide connectivity between and among computer resources connected to the network and, typically, remote networks and devices. A private network may support computer resources at a single location, e.g., a local area network (LAN) or at multiple locations, e.g., a wide area network (WAN.) The network infrastructure may include one or more routers for directing messages between and among computer resources connected to the network, while gateways and/or bridges connect the LAN or WAN to other, typically remote networks. Often, the connection to remote networks is provided using open or public communications network facilities such as the ubiquitous Internet.

Once a private network is connected to an open network or otherwise provides open access to the network, security of the private network becomes a paramount concern. Typically, some form of "firewall" is required, i.e., a system that restricts access between a protected network and the Internet, or between other sets of networks. The firewall may be implemented using one or more systems including, for example, a screening router, dual homes and screen-host gateway, a screened-subnet, and an application-level gateway (or proxy server.) Those skilled in the art of network security systems use these and other components and systems to restrict access to a protected network.

While certain components and systems provide some level of protection, there is increasing need for more sophisticated systems to help maintain network security. A network intrusion detection system (NIDS) provides capabilities to identify and respond to malicious or anomalous activities aimed at networked systems. Commercial products include AXENT® by Axent Technologies, Inc. (www.axent.com), Cisco® by Cisco Technology, Inc. (www.cisco.com), Cyber-Safe® by Cybersafe corporation (www.cybersafe.com), Safesuite® by Internet Security System, Inc. (ISS) (www.iss.net), and Shadow® (www.nswc.navy.mil/ISSEC/CID).

Further examples of network security systems are described in U.S. Pat. No. 5,414,833 of Hershey, et al. entitled "Network Security System And Method Using A Parallel Finite State Machine Adaptive Active Monitor And Responder" issued May 9, 1995; U.S. Pat. No. 5,557,742 of Smaha, et al. entitled "Method And System For Detecting Intrusion Into And Misuse Of A Data Processing System" issued Sep. 17, 1996; U.S. Pat. No. 5,720,033 of Deo entitled "Security Platform And Method Using Object Oriented Rules For Computer-Based Systems Using UNIX-Line Operating Systems" issued Feb. 17, 1998; U.S. Pat. No. 5,892,903 of Klaus entitled "Method And Apparatus For Detecting And Identifying Security Vulnerabilities In An Open Network Computer Communication System" issued Apr. 6, 1999; and U.S. Pat. No. 6,279,113 of Vaidya entitled "Dynamic Signature Inspection-Based Network Intrusion Detection" issued Aug. 21, 2001.

While these security systems inspect data packets and messages to identify attempts to gain unauthorized access to a network, processing upon detection of a network intrusion may not foil the attempt. In particular, prior art systems are divided into passive and reactive types. Passive systems monitor network traffic and generate notifications and reports that can be reviewed by security personnel. Reactive implementations perform all the functions of their passive counterparts but can also take immediate action to deny access to network resources. Most reactive NIDS systems are host based, the few network based implementations are bound to specific network hardware, specific network topologies, and work by completely filtering the offending party. Since the hosts appear unreachable to the attacker, reporting within the protected network is lost.

Accordingly, a need exists for a device and method that protects a network from externally launched attacks while tracking and reporting such events. A further need exists for a device and method of providing network security protection and reporting that is compatible with a wide range of NIDS.

SUMMARY OF THE INVENTION

The invention is a system for and method of monitoring traffic inbound to a protected network for any signs of malicious activity. Once an attack is detected, the system acts to prevent the attacker from retrieving any data from its target.

According to one aspect of the invention, a network security system includes a router connected to a protected network, the router configured to selectively route incoming messages to respective destinations on the protected network as addressed by the respective incoming messages. A network intrusion detection system (NIDS) connected to the protected network operates to detect any attack on the protected network associated with one or more of the incoming messages. A control system on the network operates to cause the router to selectively redirect a reply message associated with the one incoming message to an alternate terminus on the protected network in response to the NIDS detecting the attack (i.e., an offending message).

According to a feature of the invention, a GateD server is connected to the protected network wherein the reply message associated with the offending incoming message is initially addressed to an offending off-network IP address associated with the incoming message prior to rerouting by the router. In this case, the GateD server stores (i) the offending IP address associated with the incoming message and (ii) a static route pointing the offending LP address to the alternate terminus on the protected network.

According to another feature of the invention, the control system may further include a routing server storing a routing table. The routing server may include a GateD server.

According to another feature of the invention, the control system may be configured to execute a network routing daemon that understands a plurality of protocols including at least one or more of BGP, EGP, RIP, RIP II, OSPF, and HELLO. In this case, the NIDS may be configured to monitor the incoming messages to detect predetermined patterns of TCP/IP activity indicative of the attack on the protected network.

According to another feature of the invention, the NIDS may be configured to monitor packet headers of the incoming messages to detect probes.

According to another feature of the invention, the NIDS may be configured to monitor the incoming messages to detect one of:

(i) a network resource anomaly including activity that is different from a predetermined normal behavior; and (ii) a network resource misuse including activity corresponding to known intrusion techniques, a known intrusion signature, and/or known system vulnerabilities.

According to another feature of the invention, the NIDS may be configured to notify the control system of detecting the attack via a (i) system log (syslog) and/or (ii) Simple Network Management Protocol (snmp) trap.

According to another feature of the invention, the NIDS may be configured to mirror ports addressable corresponding to the destinations on the protected network.

According to another feature of the invention, the router may include a routing table, the control system configured to introduce to the router a preferred route into the routing table. The preferred route is effective to selectively redirect the reply message to the alternate terminus on the protected network. The alternate terminus on the protected network may be a system configured to analyze the reply message to identify network vulnerabilities of the protected network.

According to another feature of the invention, the control system may be configured to put an Exterior Gateway Protocol (EGP) neighbor corresponding to a destination of the reply message into a down state and generate a corresponding egpNeighborLoss trap.

According to another feature of the invention, the control system may redirect the reply message to the NIDS. The NIDS may then operate to analyze the reply message to identify network vulnerabilities.

According to another aspect of the invention, a network security system includes a protected network configured to route a message between (i) a plurality of network nodes and (ii) at least one external node. A router connected to the network receives the incoming message from the external node and selectively route it to the addressed network node. A NIDS monitors the incoming message to the protected network and provides an indication of an attempt to gain unauthorized access to the protected network. A control system is responsive to an attack so as to cause the router to selectively redirect to a one of the network node on the protected network a reply message associated with the incoming message in response to the NIDS detecting the attack.

According to another aspect of the invention, a method of operating a network security system includes a step of selectively routing a message incoming to respective destinations on a protected network. A step of detecting an attack on the protected network associated with one of the incoming messages initiates a selective redirection of a reply message associated with the associated incoming message to a destination on the protected network (instead of to the external address) in response to the step of detecting the attack.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

DETAILED DESCRIPTION OF THE INVENTION

A network security system according to the invention provides a complete, reactive, NIDS designed to stop a would-be hacker or "a hacker" from gaining unauthorized access by blocking their connectivity to a protected network at the first sign of malicious activity. The network security system utilizes a commercially available or open source NIDS that can detect patterns in TCP/IP activity as well as examining packet headers to detect probes and attempts to compromise systems, it then modifies the return route from the "victim" protected network so that outbound packets are never returned to the attacker. Suitable NIDS include Cisco's NetRanger™, NFR Flight Recorder™, ODS CMDS, ISS RealSecure SAFEsuite™, Shadow™, Tripwire Enterprise™, NAI Cybercop™, AXENT OmniGuard™ and Intruder Alert™, eTrust Intrusion Detection™, CyberSafe Centrax™, Security Dynamics Kane Security Monitor™ and others.

The network security system preferably includes a NIDS that is capable of sending external notifications via syslog, or snmp traps, and is compatible with a network configuration that utilizes the Border Gateway Protocol (BGP) for routing. When an attack is detected, the return route from machines (i.e., nodes) in the protected network is modified. Modification of the return route to circumvent responding to the attach is an improvement over designs that simply filter the attacker because, while hosts will appear unreachable to them, reporting within the protected network is not lost. Thus, once the NIDS detects an attack, the network security system acts to prevent the attacker from retrieving any data from its target. However, servers on the protected can still see the attempted attack, but no data will be sent back to the attacker. Once an attacker is identified, its identity may be communicated to other network security systems on other networks to "black hole" the attacker from receiving responses.

Figure 1:
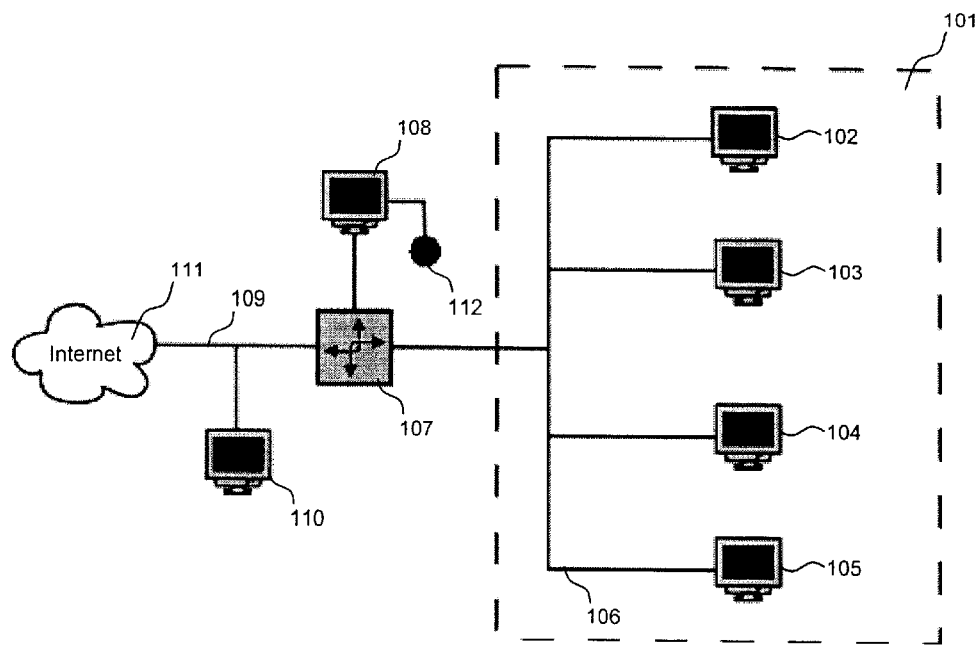
FIG. 1 is a simplified block diagram of a security system connected to a protected network for inhibiting return messages to an external node mounting an attack against the network.

Referring to FIG. 1, a protected network 101 includes a plurality of machines or nodes 102–105. Although depicted in the present illustration as personal computers, the nodes may be any addressable device, system, subnetwork, router, gateway or similar device or structure. Nodes 102–105 are connected to each other and to router 107 via a communications infrastructure such as wide area network (WAN) 106. WAN 106 may be any suitable network architecture including, for purposes of example only, an Ethernet based system.

Router 107 may also include a gateway functionality to interconnect WAN 106 to Internet 111. Router 107 may be a conventional device compatible with BGP such as sold by Cisco® and others. NIDS 110 is placed in a position to monitor all incoming traffic to protected network 101. This is achieved by mirroring the ports used by inbound traffic on router 107. Multiple NIDS may be required depending on the amount of incoming traffic and the capacity of the server.

A network security controller 108 preferably runs a GateD server, and is configured as a BGP peer to the router. Network security controller 108 may be implemented on a conventional platform such as a personal computer, workstation, dedicated processor, system, etc.

As one skilled in the art would understand, the GateD server portion of security controller 108 is a modular software program consisting of core services, a routing database, and protocol modules supporting multiple routing protocols including RIP versions 1 and 2, DCN HELLO, OSPF version 2, EGP version 2 and BGP version 2 through 4 (the last being preferred in the present embodiment). Using GateD a network administrator and/or network security controller 108 can control import and export of routing information by individual protocol, by source and destination autonomous system, source and destination interface, previous hop router, and specific destination address. The network administrator and network security controller 108 can further specify a preference level for each combination of routing information being imported by using a flexible masking capability. Once the preference levels are assigned, GateD makes a decision on which route to use independent of the protocols involved. Accordingly, GateD capabilities to handle dynamic routing with a routing database built from information exchanged by routing protocols allows network security controller 108 to readily redefine routing as necessary to circumvent completion of a reply message to an attacker.

The Border Gateway Protocol (BGP) is an inter-Autonomous System routing protocol having the capability to exchange network reachability information with other BGP systems. This network reachability information includes information on the list of Autonomous Systems (ASs) that reachability information traverses. A Border Gateway Protocol 4 (BGP-4) is defined in RFC-1771 and related documents including RFC-1657; RFC-1772–1774; RFC-1965; RFC-1966; and RFC-1996–1998.

Figure 2:
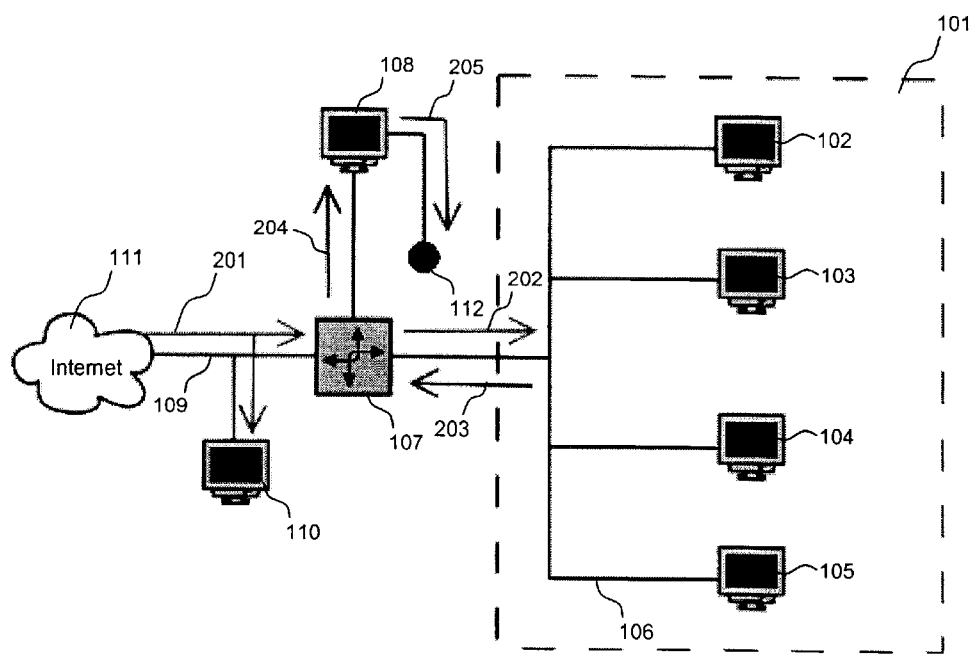
FIG. 2 is a simplified block diagram of message rerouting flow performed by a security system upon detection of an attack on the protected network from an external node.

Referring to FIG. 2, and incoming message to the protected network is received from, in this example, Internet 111 and is routed to both router 107 and NIDS 110 as indicated by arrow 201. NIDS 110 monitors and analyzes the incoming message traffic for malicious activity. Detection of malicious activity may include anomaly detection and signature recognition. Anomaly detection includes recognition of statistical anomalies by establishing a baseline of certain activities such CPU utilization, disk activity, user logins, file activity, etc. Then the NIDS responds to a deviation from this baseline. Signature recognition is based on examination of network traffic to identify known patterns of attack. This requires that, for each hacker technique, the NIDS must be programmed to recognize the technique. For example, signature recognition may be implemented based on a pattern matching method. In this case, the NIDS examines all incoming packets for the pattern "/cgi-bin/phf?", which may be indicative of an attempt to access a vulnerable CGI script on a web-server. Other similar and more sophisticated techniques of analysis may also be employed.

If NIDS 110 identifies the incoming message as an attack on the network, it generates an alert message to network security controller 108. In response, network security controller 108 manipulates updates in its GateD server to announce to router 107 a new route for the offending IP address. Whether or not a network intrusion or attack is detected, unless the message is itself harmful to the addressed node, the message is routed to the target node as shown by arrow 112. Alternatively, messages considered to be harmful to the network may be blocked from the network and/or the session can be forced to terminate.

After receipt and processing by the addressed node 102, 103, 104 or 105, the node transmits back a reply message to the offending IP address. Typically, this IP address is the same as that of the originator IP address associated with the incoming message. However, having a new route designated for the offending IP address, router 107, rather than passing the message on to Internet 111, instead routes the message to network security controller 108 and a phantom node or "black hole" 112. Network security controller 108 can then coordinate with NIDS 110 to analyze the attack.

The GateD server used as part of security controller 108 is a BGP neighbor of all WAN routers on the network including router 107. If route-reflectors are used, then only a session with the route-reflectors is required. When NIDS 110 announces an offending IP address to the GateD server of network security controller 108, the GateD server adds a static route to its tables which points the offending IP to the local interface. This route is then introduced into the routing tables of all WAN routers including router 107 and since it is a /32, it is preferred over all other routes. All offending traffic destined outside protected network 101 is then diverted to the GateD host, i.e., network security controller 108. At that point, the traffic can be analyzed or simply discarded. This implementation allows the victim (e.g., node 102, 103, 104 or 105) to see all incoming traffic. However, outgoing traffic from the victim that is used to discover and exploit vulnerabilities will never reach the attacker. For example, if a sweep is detected by NIDS 110, network security controller 108 immediately acts to block traffic so the attacker does not receive any responses. The attacker then cannot discover any information about the servers in the network and is forced to move on.

Figure 3:
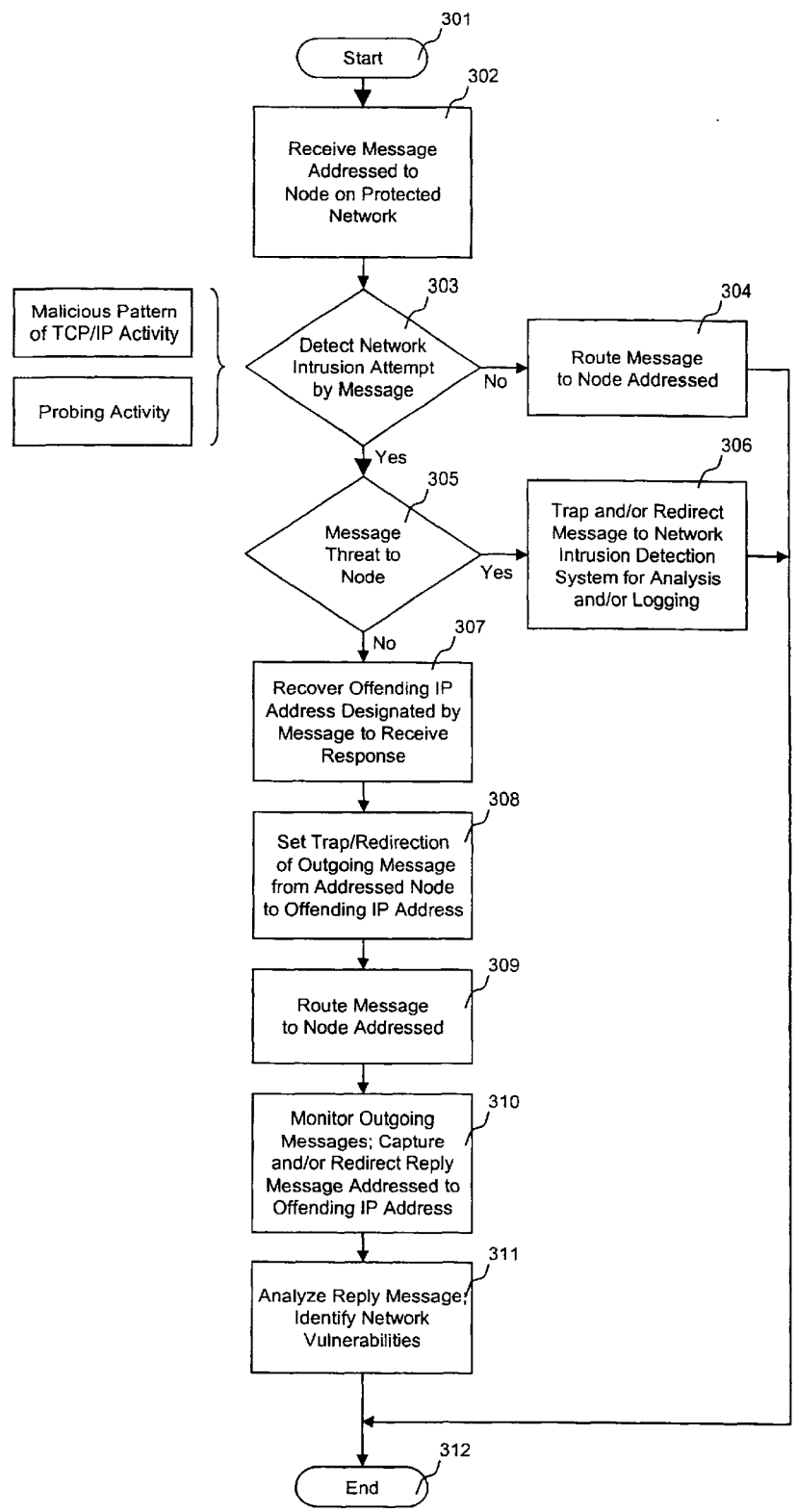
FIG. 3 is a flow chart of a method of detecting and inhibiting reply messages to an attacking node or in response to an attack.

A method according to the invention is presented in FIG. 3. Therein after beginning the method at step 301, a message addressed to one of the nodes on the protected network is received at step 302. The NIDS makes an initial check at step 303 to determine whether the message is an intrusion attempt. The NIDS may check for activation such as a malicious pattern of TCP/IP activity (or equivalent in connection with other protocols). If the message does not represent an attack on the network, it is passed to the addressed node at step 304 and processing terminates until receipt of any next incoming message. Alternatively, if the message does represent a threat to the network or to a node on the network, then a check is performed at step 305 to determine if the message is so dangerous as to warrant blocking it from the network. Thus, inherently dangerous messages are trapped at step 306 or routed (possibly in an encapsulated form) to the NIDS for analysis and/or logging of the attempt. Messages which represent an intrusion attack but are eligible for routing to their destination node on the network are processed at step 307 to identify the offending IP address, e.g., the IP address of the message originator or other node to which a reply is to be directed by the target addressed node. Using the offending IP address, a trap or redirection based on the offending IP address is established at step 308. As detailed above, the trap or redirection is performed by the network security controller manipulation of updates in its GateD server to announce to router 107 a new route for the offending IP address. Once the redirection had been established, the message is passed to the target addressed node at step 309.

Outgoing messages are monitored at step 310 for routing so that, effectively, the redirection causes the offending message to be captured instead of being routed to its original destination. At step 311 the offending message is analyzed to identify network vulnerabilities.

Although the present embodiment of the invention has been described in terms of specific divisions of functionalities, it is understood that other divisions and architecture may be implemented. For example, the NIDS, security controller, and GateD functions may be provided on a single or multiple platforms in various combinations and configurations. Further, while the present embodiment depicts a single WAN as the protected network, the invention is applicable to LANs and multiple WANs of a variety of configurations. Additionally, while a TCP/IP protocol is mentioned, the invention is applicable to a wide range of data communications systems and methods. Thus, while the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

It should further be noted and understood that all publications, patents and patent applications mentioned in this specification are indicative of the level of skill of those skilled in the art to which the invention pertains. All publications, patents and patent applications are herein incorporated by reference to the same extent as if each individual publication patent or patent application was specifically and individually indicated to be incorporated by reference in its entirety.

What is claimed is:

1. A network security system for a protected network, comprising:
    a router connected to the protected network and configured to selectively route incoming messages to respective destinations on the protected network addressed by respective ones of said incoming messages;
    a NIDS connected to the protected network and configured to detect an attack on the protected network associated with one of said incoming messages; and
    a network security controller connected to the protected network and configured to cause said router to selectively redirect to an alternate terminus a reply message associated with said one incoming message in response to said network intrusion detection system detecting said attack.

2. The network security system according to claim 1 further comprising a GateD server connected to the protected network, wherein said reply message associated with said one incoming message is initially addressed to an offending IP address associated with said incoming message prior to rerouting by said router, and said GateD server is configured to store (i) said offending IP address associated with said incoming message and (ii) a static route pointing said offending IP address to said alternate terminus on said protected network.

3. The network security system according to claim 1 wherein said network security controller further comprises a routing server storing a routing table.

4. The network security system according to claim 3 wherein said routing server comprises a GateD server.

5. The network security system according to claim 1 wherein said network security controller is configured to execute a network routing daemon that understands a plurality of protocols including at least one of BGP, EGP, RIP, RIP II, OSPF, and HELLO.

6. The network security system according to claim 1 wherein said network intrusion detection system is configured to monitor said incoming messages to detect predetermined patterns of TCP/IP activity indicative of said attack on the protected network.

7. The network security system according to claim 1 wherein said network intrusion detection system is configured to monitor packet headers of said incoming messages to detect probes.

8. The network security system according to claim 1 wherein said network intrusion detection system is configured to monitor said incoming messages to detect one of:
    (i) a network resource anomaly including activity that is different from a predetermined normal behavior; and
    (ii) a network resource misuse including activity corresponding to known intrusion techniques, known intrusion signature, and/or known system vulnerabilities.

9. The network security system according to claim 1 wherein said network intrusion detection system is configured to notify said network security controller of detecting said attack via one of a (i) system log (syslog) and (ii) Simple Network Management Protocol (snmp) trap.

10. The network security system according to claim 1 wherein said network intrusion detection system is configured to mirror ports addressable corresponding to said destinations on said protected network.

11. The network security system according to claim 1 wherein said router includes a routing table and said network security controller is configured to introduce to said router a preferred route into said routing table, said preferred route configured to selectively redirect said reply message to said alternate terminus on the protected network.

12. The network security system according to claim 11 wherein said alternate terminus on the protected network comprises a system configured to analyze said reply message to identify network vulnerabilities of the protected network.

13. The network security system according to claim 1 wherein said alternate terminus is said network intrusion detection system.

14. The network security system according to claim 1 wherein said alternate terminus comprises a node on said protected network.

15. The network security system according to claim 1 wherein said control system is configured to put an Exterior Gateway Protocol (EGP) neighbor corresponding to a destination of said reply message into a down state and generates a corresponding egpNeighborLoss trap.

16. The network security system according to claim 1 wherein said network security controller is configured to redirect said reply message to said network intrusion detection system.

17. The network security system according to claim 16 wherein said network intrusion detection system is configured to analyze said reply message to identify network vulnerabilities.

18. A network security system, comprising:
    a protected network configured to route messages between (i) a plurality of network nodes and (ii) at least one external node;
    a router connected to said protected network and configured to receive incoming messages to said protected network from said external nodes and to selectively route said incoming messages to ones of said network nodes addressed by respective ones of said incoming messages;
    a network intrusion detection system connected to said protected network and configured to monitor said incoming messages to said protected network and provide an indication of an attempt to gain unauthorized access to said protected network; and a network security controller connected to said protected network and configured to cause said router to selectively redirect a reply message associated with said one incoming message in response to said network intrusion detection system detecting said attack.

19. A method of operating a network security system, comprising the steps of:

selectively routing messages incoming to respective destinations on a protected network;

detecting an attack on said protected network associated with one of said incoming messages; and selectively redirecting a reply message associated with said one incoming message to an alternate destination in response to said step of detecting said attack.

20. The method according to claim 19 wherein said reply message is initially addressed to an offending IP address associated with said incoming message prior to said step of selectively rerouting.

21. The method according to claim 20 further comprising a step of storing (i) said offending IP address associated with said incoming message and (ii) a static route pointing said offending IP address to a local interface.

22. The method according to claim 19 wherein said detecting step further comprises a step of detecting predetermined patterns of TCP/IP activity indicative of said attack on said protected network.

23. The method according to claim 19 wherein said detecting step further comprises a step of detecting incoming probes to said protected network.

24. The method according to claim 19 wherein said step of selectively redirecting further comprises a step of introducing a preferred route into a routing table, said preferred route configured to selectively redirect said reply message to said alternate destination.

25. The method according to claim 19 further comprising a step of redirecting said reply message to a network intrusion detection system.

26. The method according to claim 25 further comprising a step of analyzing said reply message to identify network vulnerabilities.

* * * * *